May 20, 1941.  E. C. WELLS  2,242,604
FLEXIBLE EXHAUST LINE JOINT
Filed Feb. 16, 1940
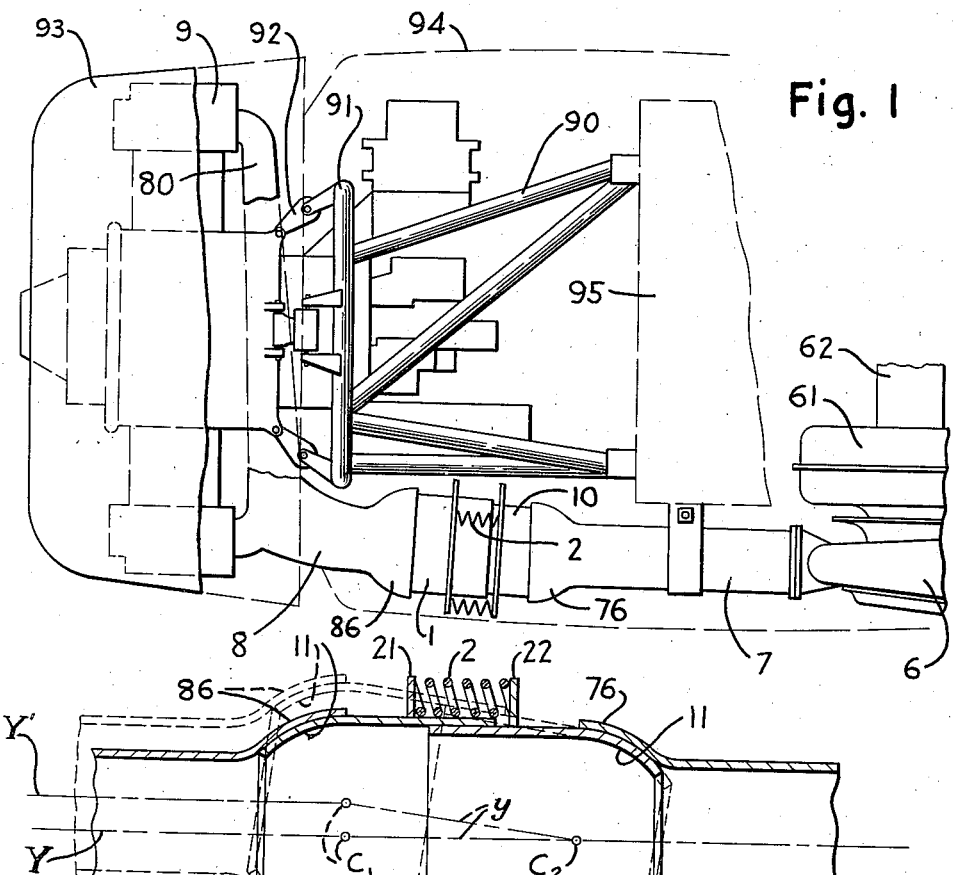
Fig. 1
Fig. 2
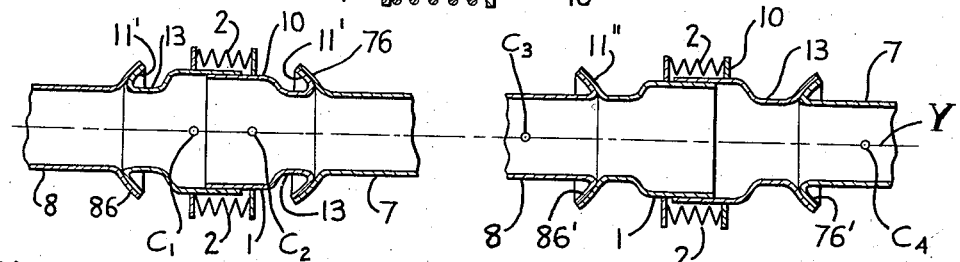
Fig. 3  Fig. 4
Inventor
Edward C. Wells
By Reynold H. Beach
Attorneys Patented May 20, 1941

2,242,604

UNITED STATES PATENT OFFICE 2,242,604

FLEXIBLE EXHAUST LINE JOINT

Edward C. Wells, Seattle, Wash., assignor to Boeing Aircraft Company, Seattle, Wash., a corporation of Washington Application February 16, 1940, Serial No. 319,287

4 Claims. (Cl. 285—92)

Aircraft engines are subject to vibration in various directions. A radial air-cooled engine vibrates or oscillates principally torsionally about the axis of its crankshaft. Flexible engine mounts are now almost universally used to absorb such vibrations and prevent their transmission to the aircraft structure. In modern aircraft turbo-superchargers of appreciable mass (wherefore they are mounted upon the relatively stationary aircraft structure) are driven from the pressure of the exhaust gas from such engines. It becomes necessary to provide a conduit with a flexible joint between the oscillatably mounted engine and the fixedly mounted turbo-supercharger. This joint, while subjected to intensely high temperatures, precluding any attempt at lubrication, must still work freely under widely varying conditions so that it will not appreciably damp vibrations in any direction, nor transmit them from the engine to the aircraft structure, yet it must be sufficiently tight to avoid appreciable lessening of the pressure of the exhaust gas. This pressure at no time reaches a high value, and must be conserved and utilized to drive the exhaust gas turbine. Neither must such a joint be restricted in area, for this would increase back pressure, and reduce usable pressure at the turbine.

My invention is not concerned with the engine nor the engine mount per se, nor with the turbo-supercharger as such. My invention is primarily concerned with, and has for its primary object the provision of, a flexible joint having the capabilities indicated, for use in such an installation.

It is an important object of the present invention to provide a flexible joint which will be self-sealing, and in which the force which tends to hold the joint tight will be supplied primarily by the pressure of the exhaust gas itself, without dependence upon mechanical forces such as spring forces, to the end that the joint will always be held sufficiently but not unduly tight by a force which varies in accordance with variations in the exhaust gas pressure, and which is therefore always adequate, under all conditions, and without binding, to maintain the joint self-sealing and adequately tight.

It is likewise an object to provide a joint for such uses which, in a pressure conduit, is held tight not only by the pressure differential between the gas coursing through it and the lower exterior pressure, but which is further held tightly by a pressure increase effective especially at the joint, due to a reverse Venturi effect.

With these and other objects in mind, as will appear hereafter, my invention comprises the novel joint, and the novel combination and arrangement of parts with respect to such joint, as shown in the accompanying drawing, and as will be described in this specification and more particularly defined by the claims which terminate the same.

In the accompanying drawing I have shown my invention in conjunction with an engine, supporting framework and flexible engine mount of typical form, and I have shown the joint itself in various illustrative forms, each of which incorporates the principles of my invention, it being understood, however, that the form, arrangement, and characteristics of a particular joint may be varied in accordance with the principles of my invention, as may be desired for any particular installation or by any individual designer.

Figure 1 is an elevation with housing elements broken away, illustrating such an installation in conjunction with an engine and engine mount, and in conjunction with a turbo-supercharger.

Figure 2 is an axial section through the joint itself, in a preferred form.

Figure 3 is a view similar to Figure 2, and Figure 4 is a similar view, each showing further modifications of the joint.

Referring first to Figure 1, a conventional engine mount structure is indicated at 90, terminating in an engine mount ring 91, from the latter of which, by means of flexible joints of any suitable type, represented at 92, the engine 9 is supported. These engine mounts 92 generally have the characteristic of permitting limited movement fore and aft, up and down, and torsionally, that is, in all directions. The engine is normally supported within a cowl ring 93, and its rear or accessory section is housed within a cowling indicated at 94, and suitably supported from the framework 90, 91. The latter framework is supported from the general airplane structure indicated at 95.

The engine cylinders discharge exhaust gas into an exhaust collector ring 80, which terminates in a short exhaust pipe 8. These exhaust conduits vibrate with the engine whereon they are mounted. Aligned with but spaced from the exhaust pipe 8 is a tail pipe 7 which is fixedly mounted, by conventional means not shown, upon the structure 90 or 95. Supplied with exhaust gas under pressure from the tail pipe 7 may be such an element as the exhaust turbine 6 which in turn is connected to drive the supercharger 61, supplied with air by means of an intake pipe 62, All the latter structure is usually fixedly supported from the main aircraft structure, or from the nacelle or the aircraft structure 95, the precise mounting varying in different installations and designs.

Between the exhaust pipe 8 and the axially aligned but rearwardly spaced tail pipe 7 is disposed the flexible joint which connects the two pipes, and which permits vibration-induced movement or oscillation of one with respect to the other. This joint is shown in detail in a preferred form in Figure 2.

The joint itself is very simply constructed of a plurality, preferably two only, telescoping sleeves 1 and 10. These tubes slide telescopingly one within the other, along their common axis, which is also the general common axis Y of the pipes 8 and 7, when the engine is at rest. When the engine is oscillating the axis of the pipe 8 may be displaced, for instance as is indicated at Y'. The illustration may be somewhat exaggerated as to the degree of displacement, but a displacement of the axis of this nature occurs because of the oscillation permitted by the flexible engine mounts 92.

The outer end of each sleeve, or if there are more than two sleeves, the outer ends of the terminal sleeves, are belled, preferably spherically, as is indicated at 11. If the oscillation were in a single plane or direction only, it would be unnecessary that the belling be spherical in nature, but the oscillations of the engine normally have various components in various directions, and it is preferred that the belling be spherical so that the joint may be universally flexible, to a limited extent at least. The matching ends of the pipes 8 and 7 are correspondingly belled, as is indicated at 86 and 76, respectively. The respective centers of these bells are represented at $C_1$ and $C_2$. The center $C_1$ shifts its position with the shifting of the axis Y, but the center $C_2$ is to all intents and purposes stationary. As a result the axis $y$ of the joint itself moves angularly (somewhat conically) about $C_2$ as a center, as is indicated in Figure 2. In so doing the joint may elongate slightly and contract, but the telescoping of the sleeves 1 and 10 accommodates this, while the angular movement is accommodated by the spherically belled ends 11 fitting within the respective matching belled ends 86 and 76.

The belled ends of the sleeves are normally urged apart, not so much by the springs 2 reacting between the lugs or ears 21 and 22 upon the respective sleeves 1 and 10, but by reason of the fact that the exhaust pressure itself, acting upon the sleeves 1 and 10, produces a force acting and reacting along the axis $y$ towards each of the belled ends 11.

The belling of the ends 11 produces a shoulder, and locates the smallest diameter of the joint 1, 10 at the juncture of the belled ends 11 with the matching bells 86 and 76. Inwardly of this smallest diameter, and inwardly of the shoulder thus defined, the joint sleeves 1 and 10 are of larger diameter. It follows that a given exhaust pressure P, acting within the conduits 7 and 8 and within the joint 1, 10, acts within the joint upon an area A—in excess of the area whereon it acts within the conduits—represented by the annulus of the shoulder referred to. The total force PA may be considered as acting towards the left, in Figure 2, and is equalled by an identical reaction to the right. This greater force, action and reaction, exists only within the joint, but within the joint there is a static force acting towards the two ends of the joint, and against the shoulders mentioned, to urge the joint ends apart. Since their movement apart is resisted by the belled ends 76 and 86, it follows that the joints' belled ends 11 are pressed against the ends 76 and 86 by a force which for any given pressure is determined by the area chosen for the annular shoulder, and which in any given joint varies in accordance with the exhaust pressure. Thus it is the pressure of the exhaust gas itself which produces this force, and the force is directly proportional to the variation in the exhaust gas pressure. If the exhaust gas pressure rises and requires a tighter joint to contain it, the force acting to spread apart the sleeves 1 and 10 is thereby and correspondingly increased.

There is a further force acting to hold the joint tight, arising from the fact that the pressure, as the gas flows from the pipe 8 of given diameter into the joint of larger diameter, tends to build up in the joint by the reverse Venturi effect. The exhaust pressure P may rise, in flowing into the enlarged joint, to a value of P plus P'. This pressure increment P' acts, cumulatively with the aforesaid pressure P, to produce a total force $(P+P')A$, acting to hold the joint tight, and the total force varies in accordance with any variation of pressure difference as between the exhaust pressure and the atmospheric pressure.

It can be seen now that the springs 2 are provided merely to hold and to urge apart the sleeves 1 and 10 when no exhaust pressure is acting upon them. Were there no springs provided the joint might under such conditions collapse or tend to cock, and the springs, which are light springs, merely serve to hold the joint in proper shape, with the parts in position for use during such times as the engine is not operating and there is no exhaust pressure within the exhaust conduit. Three or more such springs are normally provided, suitably distributed about the joint.

The principle of different diameters and of the resultant force tending to separate the sleeves of the joint may be embodied in various forms of joint. In Figure 2, illustrating a form which is at present preferred, the centers $C_1$ and $C_2$ are in the axis Y, extended beyond the ends of the pipes 8 and 7, and therefore within the ends of the sleeves 1 and 10, and the sleeves are of the same enlarged diameter throughout their length except as their ends which match with the ends of the pipes are belled inwardly. In Figure 3 the arrangement is substantially the same insofar as concerns the location of the centers $C_1$ and $C_2$, but the sleeves are enlarged to form the shoulder only within the telescoping portion, and then are restricted again, as indicated at 13, to substantially the same diameter at the juncture with the bells 76 and 86 as the pipes 7 and 8. The outer ends of the sleeves are then outwardly, instead of inwardly, belled, as indicated at 11'.

In Figure 4 the arrangement is substantially similar to that of Figure 3 except that the centers of the belling are indicated now at $C_3$ and $C_4$, respectively, and are located along the axis Y, but within the pipes 8 and 7, and therefore beyond the ends of the sleeves 1 and 10. It follows that the spheres of the bells are reversed; the sleeves have their end 11'' belled outwardly, both radially and along the axis, and the pipes having the respective belled ends 86' and 76' belled outwardly and backwardly, that is, backwardly toward the respective pipes.

In all these forms, as will be apparent, the smallest diameter of the terminal sleeves is at the juncture of their belled ends with the belled ends 76 and 86, and the difference of diameter as between the sleeves and the matching pipes affords a shoulder within the sleeves, facing outwardly of the joint, whereby the pressure effective on this shoulder (whether increased by the reverse Venturi effect or not) reacts as between the two shoulders upon the two sleeves to tend to spread the sleeves apart, or to separate them, that is, to force their belled ends into close fitting engagement with the belled matching ends of the two pipes. This forms a tight joint, yet one that will not unduly bind, and which is self adapting to variations in exhaust pressure.

While the preceding discussion has dwelt upon the use of the joint with a radial engine in an airplane it will be evident that other types of engines or instrumentalities are likewise subject to vibration, perhaps different in kind or degree, and are usually so mounted that they may vibrate or oscillate (the terms as herein used are synonymous) relative to their supporting structure. An instrument may be shock-mounted upon its supporting panel, yet require supply of a fluid through a conduit, and it may be desirable to employ such a joint in such an installation. Likewise, engines of automobiles are subject to like vibrations, and are similarly mounted, and the principles of this invention are useful in such installations. The specific terms used herein are to be understood then as illustrative only, not as restrictive, and to include the larger or generic sense, unless the context clearly indicates the contrary.

What I claim as my invention is:

1. A pressure-tight flexible joint for transmission and conservation of a pressure fluid between axially separated pipe ends which are independently fixed against substantial relative movement in an axial direction, but which are mounted for substantial relative bodily transverse movement, said joint including two telescoping sleeves, each having its outer end belled, and the respective matching pipe ends being disposed axially outwardly of the sleeve ends, and being correspondingly belled to define a rockable tight joint, each sleeve being each interiorly formed with an excess of diametral inwardly facing area over diametral outwardly facing area, thereby providing means upon which the internal fluid pressure acts to urge the sleeve ends outwardly into the matching pipe ends.

2. A pressure-tight flexible joint for transmission and conservation of a pressure fluid between axially separated pipe ends which are independently fixed against substantial relative movement in an axial direction, but which are mounted for substantial relative bodily transverse movement, said joint comprising two telescoping sleeves, each having its outer end spherically belled, the matching ends of the pipes being disposed axially outwardly of the sleeve ends, and being correspondingly belled, each sleeve having an excess of diametral inwardly facing area over diametral outwardly facing area, thereby providing means upon which the internal fluid pressure acts to urge each sleeve outwardly against the respective pipe ends.

3. A joint as in claim 2, characterized in that the center of the spherical belling is located along the axis of the joint, and inside the ends of the sleeves.

4. A joint as in claim 2, characterized in that the center of the spherical belling is located along the axis of each tube, and inside the ends of the pipes.

EDWARD C. WELLS.